(12) United States Patent
Hirst et al.

(10) Patent No.: US 11,409,478 B2
(45) Date of Patent: Aug. 9, 2022

(54) POWER CONSUMPTION USAGE REPORT

(71) Applicant: HEWLETT-PACKARD DEVELOPMENT COMPANY, L.P., Spring, TX (US)

(72) Inventors: Bartley Mark Hirst, Boise, ID (US); Cooper G Urie, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 83 days.

(21) Appl. No.: 16/603,494

(22) PCT Filed: Aug. 10, 2017

(86) PCT No.: PCT/US2017/046242
§ 371 (c)(1),
(2) Date: Oct. 7, 2019

(87) PCT Pub. No.: WO2019/032111
PCT Pub. Date: Feb. 14, 2019

(65) Prior Publication Data
US 2021/0303235 A1    Sep. 30, 2021

(51) Int. Cl.
*G06F 3/12*    (2006.01)
*G06F 1/28*    (2006.01)

(52) U.S. Cl.
CPC .............. *G06F 3/1221* (2013.01); *G06F 1/28* (2013.01); *G06F 3/1273* (2013.01); *G06F 3/1284* (2013.01)

(58) Field of Classification Search
CPC .... G06F 3/1221; G06F 3/1284; G06F 3/1273; G06F 1/28
See application file for complete search history.

(56) References Cited

U.S. PATENT DOCUMENTS

| | | | |
|---|---|---|---|
| 7,743,267 B2 | 6/2010 | Snyder et al. | |
| 7,991,892 B2 | 8/2011 | Hamilton et al. | |
| 8,760,713 B2 | 6/2014 | Zhan | |
| 8,874,939 B2 | 10/2014 | Honda et al. | |
| 2005/0231758 A1* | 10/2005 | Reynolds | G03G 21/04 358/1.15 |
| 2005/0280836 A1* | 12/2005 | Ferlitsch | G06F 3/1208 358/1.1 |
| 2008/0003033 A1* | 1/2008 | Aizawa | G06F 3/1221 400/62 |
| 2010/0174935 A1 | 7/2010 | Kim et al. | |

(Continued)

FOREIGN PATENT DOCUMENTS

AU    2010257235    6/2011

OTHER PUBLICATIONS

HP'S Managed Print Services Enhances Productivity And Cuts Costs < http://www.geekinsider.com/hps-managed-print-services-enhances-productivity-cuts-costs/ >.

*Primary Examiner* — Juan M Guillermety
(74) *Attorney, Agent, or Firm* — Dicke Billig & Czaja PLLC

(57) ABSTRACT

Examples disclosed herein relate to receiving a usage report from a printer, wherein the usage report comprises a count of pages printed and a time spent in a first power state; calculating a power consumption for the printer according to the usage report, and providing a report of historic power consumption.

14 Claims, 3 Drawing Sheets

(56) References Cited

U.S. PATENT DOCUMENTS

| | | | |
|---|---|---|---|
| 2010/0235656 A1* | 9/2010 | Murata | G06F 1/28 |
| | | | 713/300 |
| 2011/0116128 A1* | 5/2011 | Tamada | G06F 3/1229 |
| | | | 358/1.15 |
| 2011/0282603 A1 | 11/2011 | Milenkovic et al. | |
| 2011/0318044 A1* | 12/2011 | Matsumoto | G06F 3/1221 |
| | | | 399/88 |
| 2012/0053885 A1* | 3/2012 | Kato | G06F 3/1221 |
| | | | 702/128 |
| 2012/0113452 A1 | 5/2012 | Takeshita | |
| 2012/0167109 A1* | 6/2012 | Muralidhar | G06F 9/5094 |
| | | | 713/340 |
| 2012/0243057 A1 | 9/2012 | Sano | |
| 2013/0031385 A1* | 1/2013 | Seto | G06F 1/28 |
| | | | 713/300 |
| 2014/0223325 A1* | 8/2014 | Melendez | G06F 3/1229 |
| | | | 715/744 |
| 2014/0268213 A1* | 9/2014 | Ebner | G06F 3/1221 |
| | | | 358/1.15 |
| 2016/0286059 A1* | 9/2016 | Hitaka | H04N 1/00344 |
| 2017/0286023 A1* | 10/2017 | Akimoto | G06F 3/1221 |
| 2018/0007215 A1* | 1/2018 | Zakharov | G06F 3/121 |

* cited by examiner

POWER CONSUMPTION USAGE REPORT

BACKGROUND

Various devices, such as printers, are utilized in home and office environments. These printers require power to operate, which can constitute a significant portion of a location's operating expenses.

BRIEF DESCRIPTION OF THE DRAWINGS

In the accompanying drawings, like numerals refer to like components or blocks. The following detailed description references the drawings, wherein.

DETAILED DESCRIPTION

In some situations, printers and other equipment may represent an ongoing operating expense for users and operators of that equipment. It is helpful for such operators to be able to measure the amount of power used by this equipment and estimate the ongoing costs of that operation. This can be used to optimize the use and job distribution of the equipment as well as plan for predicted operating expenses.

Accurate energy use estimation of this equipment can be prohibitively expensive, however, if implemented in electrical circuitry due to the need to measure AC voltage, AC current and then compensate for the power factor (phase angle between the AC voltage and AC current) as well as correctly compensate for the effect of AC current harmonics in the power computation. The energy use of a xerographic printer, for example, may span 3 orders of magnitude. Designing the measuring circuitry for this wide range increases the cost and complexity of the device's electrical circuitry to measure the energy use. At low power levels, the measurement of energy use becomes even more difficult as the AC current levels and power factor become very small and the harmonic current content becomes very high. At these conditions, it becomes very difficult to accurately estimate energy use. A xerographic printer that spends a large amount of its time in a low-power sleep mode may thus complicate an accurate estimate of the total energy use by the device.

Instead of using expensive measurement circuitry, the energy use of the device may be pre-characterized in different modes of operation, such as active, ready, and sleep. Other modes and variations of those modes (e.g., standby and hibernate variations on the sleep mode) may also be contemplated. In a print mode, for example, the energy use may be characterized on a Watthours/page basis, while in non-printing modes of operation the energy use may be based on an average wattage drawn for each mode and the time that the printer spends in each mode. The data for the modes of operation may be gathered by the manufacturer, such as prior to a product's sales release, as part of competitive performance claims, and/or for the publication of data for compliance and regulations. Estimations may then be calculated for these devices based on the amount of time spent in each mode, for example, without the requirement for expensive measuring hardware.

Figure 1:
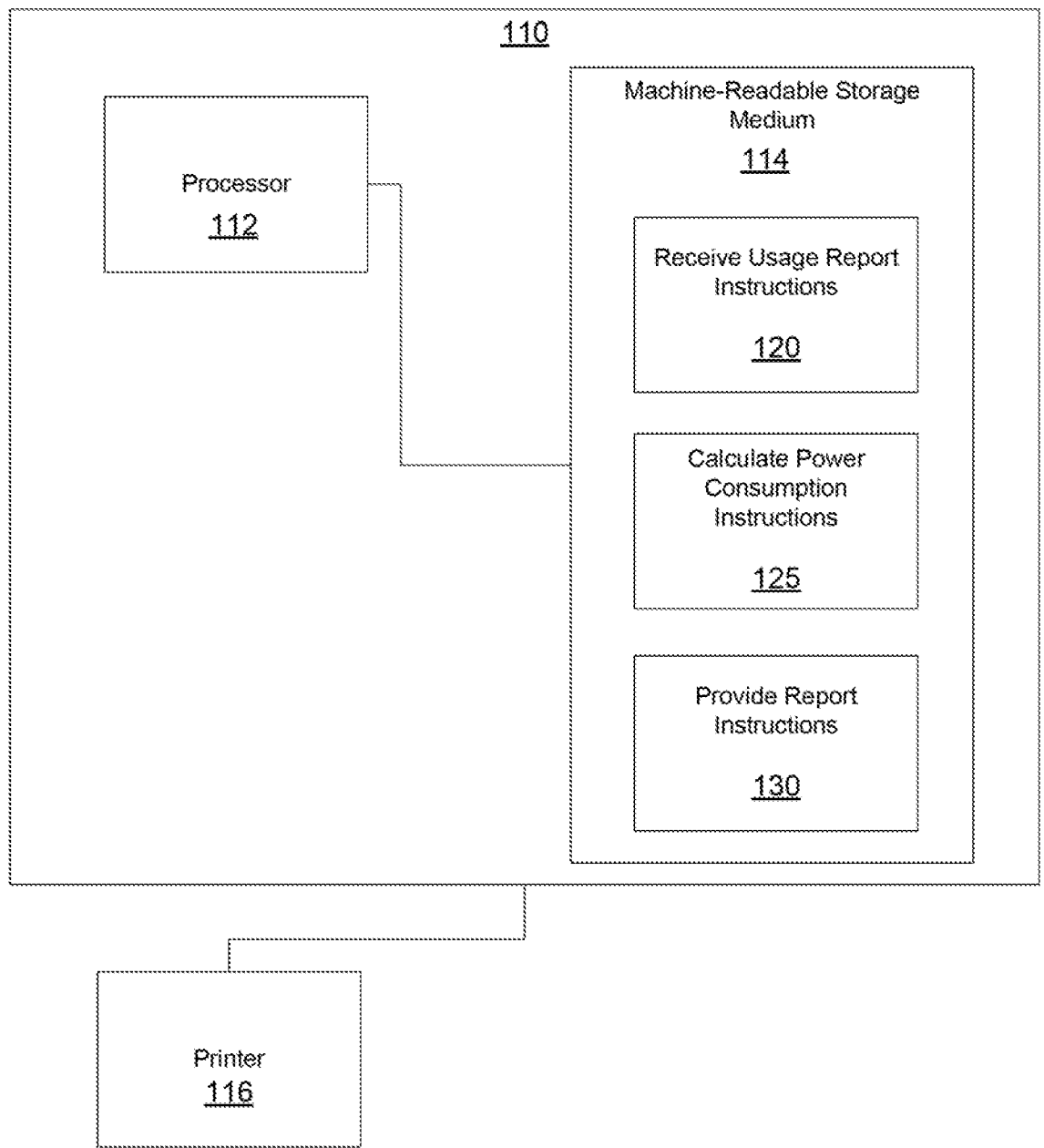
FIG. 1 is a block diagram of an example computing device for providing a power consumption usage report.

FIG. 1 is a block diagram of an example computing device 110 for providing a power consumption usage report. Computing device 110 may comprise a processor 112 and a non-transitory, machine-readable storage medium 114. In some implementations, computing device 110 may be coupled to a printer 116 and/or a plurality of printers. Such couplings may include a network, wire connection (e.g., a USB cable), and/or other communicative coupling. Storage medium 114 may comprise a plurality of processor-executable instructions, such as receive usage report instructions 120, calculate power consumption instructions 125, and provide report instructions 130. In some implementations, instructions 120, 125, 130 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125, 130.

Executable instructions 120, 125, 130 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Pre-measured power consumption data may be stored for each printing device. The data may be applicable to a plurality of devices, such as each device of a specific model, and/or for specific devices to account for different component configurations. The data may be stored independently on each device (e.g., in firmware memory) and/or stored at a central data collection device. Such data may be updated from time to time as measurements are conducted on relevant devices.

Various pieces of information may be used to create an accurate estimate of energy use at different power states for a printer and/or other device. Such information may comprise, for example, which use states are enabled (e.g., ready, standby, active, sleep, hibernate), time delay before a standby, sleep, and/or hibernate state is entered, print history, power drawn in each state in Watts, average energy used per page based on page type (e.g., mono or color) in Watt-hours per page, and time spent in each state. The different device states may comprise a ready state where the device is ready to receive and print data, a standby state wherein the device is performing diagnostics, calibration, power-on steps, configuration changes, etc., an active state wherein the device is outputting printed pages, a sleep state wherein printing components are powered off but other components (e.g., network hardware, processor, storage devices) may remain active, and a hibernate state where at least some non-printing components are also powered off. Different printing devices may use different state definitions and multiple sleep/hibernate states may be configured.

Before entering a hibernate state, the printing device may log a start time and/or start a timer. Logging the wake time from the hibernate state and/or stopping the timer may be used to track the amount of time spent in the hibernate state, and/or the device may wake on a regular interval to report that it is remaining in the hibernate state.

Receive usage report instructions 120 may comprise instructions to receive a usage report from a printer 116. The usage report may comprise a count of pages printed and a time spent in a first power state. In some implementations, the accumulated energy value may be updated after each print job and/or at a configurable interval in each power state. In a hibernate state, the usage report may be provided by printer 116 to device 110 upon transition to a different state rather than at a specific time interval. In some implementations, instructions 120 to receive the usage report from the printer 116 may comprise instructions to receive and aggregate energy usage reports from a plurality of printers.

Calculate power consumption instructions 125 may calculate a power consumption for the printer according to the usage report(s). For example, an accumulated energy consumption for printer 116 may be calculated as such: Energy (in Watt hours)=(Average Per Page Watt Hours*number of pages printed)+State 1 Enabled*[(State 1 Power*Time spent in State 1)]+State 2 Enabled*[(State 2 Power*Time in State 2)] . . . +State N Enabled*[(State N Power*Time in State N)]. In some implementations, the energy used per page may comprise different average per page Watt hours for different types of pages (e.g., mono or color, single sided or duplex, finishing options, etc.). The calculations for each page type may thus be summed in the overall calculation. Power for each state (e.g., State 1 Power) may be based on the wattage drawn by the printer 116 while in that state, and may be measured by the manufacturer. The power for each state may, for example, be defined on a model basis and/or on an individual device basis. In various implementations, the State Power for each state and the average per page Watt hours for each page type may be stored on printer 116 and/or device 110 and may be updated if new data becomes available.

For example, State 1 may comprise a Ready state, State 2 may comprise a Sleep state, and State N may comprise a Hibernate state. Other states (e.g., Standby) may also use the same formula wherein if the state is enabled, then energy used is equal to power drawn in that state*the amount of time spent in that state. Each state may be defined by the components of printer 116 active in each state and thus affecting the power drawn in that state. For example, a Sleep state may have Sleep 1 and Sleep 2 sub-states where the only different component is a fan running in Sleep 1 and stopped in Sleep 2 within printer 116. This may change the power drawn and so the time in each of Sleep 1 and Sleep 2 states may be tracked independently.

Calculate power consumption instructions 125 may comprise instructions to multiply the count of pages printed by a watt-hours per page measurement. Such a measurement may be performed, for example, by the manufacturer of the printer 116 and may be stored in the firmware of printer 116 and/or on device 110. The per-page measurement may be tailored based on page characteristics, such as mono or color, media type and/or size, and/or duplexing and finishing options. Each page comprising a given set of characteristics may be multiplied by the per-page measurement for those characteristics. For example, 100 mono, single-sided, letter size pages may be multiplied by a first per-page measurement then added to 60 color, single-sided, A4 size pages multiplied by a second per-page measurement to accumulate the total energy drawn for all 160 pages.

Provide report instructions 130 may comprise instructions to provide a report of historic power consumption. For example, power used by the printer 116 may be reported for a configurable time period, such as an hour, day, week, month, quarter, year, etc. A specific time range may also be specified and the power consumed during that time range calculated based on the received usage report(s).

Provide report instructions 130 may further comprise instructions to provide the report of historic power consumption for the plurality of printers. For example, power consumption may be reported independently and/or in the aggregate for each of a set of printers. The set of printers may comprise all printers for which usage reports have been received and/or a selected subset of the printers.

Provide report instructions 130 may further comprise instructions to provide a report of projected power consumption based on the calculated power consumption for the printer. For example, printer 116 may have consumed an average of 0.15 kWh per day for the last 7 days. A projected power consumption report may simply extrapolate that average for the next 7 days and/or may perform additional calculations such as taking into account year over year changes. The projected power consumption may also use longer term averages and/or standard deviations to provide projections for future power consumption.

Figure 2:
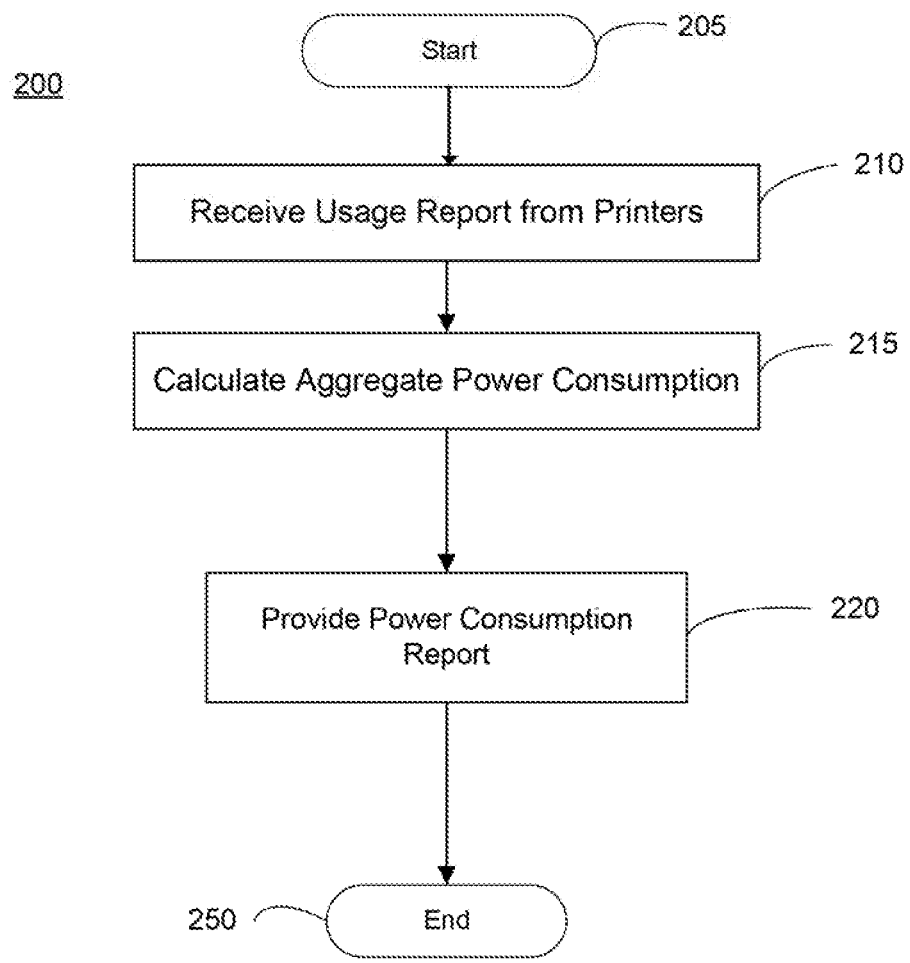
FIG. 2 is a flowchart of an example of a method for providing a power consumption usage report.

FIG. 2 is a flowchart of an example method 200 for providing a power consumption usage report. Although execution of method 200 is described below with reference to computing device 110, other suitable components for execution of method 200, such as printer 116 may be used.

Method 200 may begin at stage 205 and advance to stage 210 where device 110 may receive a usage report from each of a plurality of printers, wherein the usage data comprises a count of pages printed and a time spent in each of a plurality of power states. For example, receive usage report instructions 120 may comprise instructions to receive a usage report from a printer 116. The usage report may comprise a count of pages printed and a time spent in a first power state. In some implementations, the accumulated energy value may be updated after each print job and/or at a configurable interval in each power state. In a hibernate state, the usage report may be provided by printer 116 to device 110 upon transition to a different state rather than at a specific time interval. In some implementations, instructions 120 to receive the usage report from the printer 116 may comprise instructions to receive and aggregate energy usage reports from a plurality of printers.

Calculate power consumption instructions 125 may calculate a power consumption for the printer according to the usage report(s). For example, an accumulated energy consumption for printer 116 may be calculated as such: Energy (in Watt hours)=(Average Per Page Watt Hours*number of pages printed)+State 1 Enabled*[(State 1 Power*Time spent in State 1)]+State 2 Enabled*[(State 2 Power*Time in State 2)] . . . +State N Enabled*(State N Power*Time in State N)].

In some implementations, the energy used per page may comprise different average per page Watt hours for different types of pages (e.g., mono or color, single sided or duplex, finishing options, etc.). The calculations for each page type may thus be summed in the overall calculation. Power for each state (e.g., State 1 Power) may be based on the wattage drawn by the printer 116 while in that state, and may be measured by the manufacturer. The power for each state may, for example, be defined on a model basis and/or on an individual device basis. In various implementations, the State Power for each state and the average per page Watt hours for each page type may be stored on printer 116 and/or device 110 and may be updated if new data becomes available.

For example, State 1 may comprise a Ready state, State 2 may comprise a Sleep state, and State N may comprise a Hibernate state. Other states (e.g., Standby) may also use the same formula wherein if the state is enabled, then energy used is equal to power drawn in that state*the amount of time spent in that state. Each state may be defined by the components of printer 116 active in each state and thus affecting the power drawn in that state. For example, a Sleep state may have Sleep 1 and Sleep 2 sub-states where the only different component is a fan running in Sleep 1 and stopped in Sleep 2 within printer 116. This may change the power drawn and so the time in each of Sleep 1 and Sleep 2 states may be tracked independently.

Method 200 may then advance to stage 215 where device 110 may calculate an aggregate power consumption for the plurality of printers according to the usage data. For example, calculate power consumption instructions 125 may comprise instructions to multiply the count of pages printed by a watt-hours per page measurement. Such a measurement may be performed, for example, by the manufacturer of the printer 116 and may be stored in the firmware of printer 116 and/or on device 110. The per-page measurement may be tailored based on page characteristics, such as mono or color, media type and/or size, and/or duplexing and finishing options. Each page comprising a given set of characteristics may be multiplied by the per-page measurement for those characteristics. For example, 100 mono, single-sided, letter size pages may be multiplied by a first per-page measurement then added to 60 color, single-sided, A4 size pages multiplied by a second per-page measurement to accumulate the total energy drawn for all 160 pages.

Pre-measured power consumption data may be stored for each printing device. The data may be applicable to a plurality of devices, such as each device of a specific model, and/or for specific devices to account for different component configurations. The data may be stored independently on each device (e.g., in firmware memory) and/or stored at a central data collection device. Such data may be updated from time to time as measurements are conducted on relevant devices.

Various pieces of information may be used to create an accurate estimate of energy use at different power states for a printer and/or other device. Such information may comprise, for example, which use states are enabled (e.g., ready, standby, active, sleep, hibernate), time delay before a standby, sleep, and/or hibernate state is entered, print history, power drawn in each state in Watts, average power drawn per page based on page type (e.g., mono or color) in Watt-hours per page, and time spent in each state. The different device states may comprise a ready state where the device is ready to receive and print data, a standby state wherein the device is performing diagnostics, calibration, power-on steps, configuration changes, etc., an active state wherein the device is outputting printed pages, a sleep state wherein printing components are powered off but other components (e.g., network hardware, processor, storage devices) may remain active, and a hibernate state where at least some non-printing components are also powered off. Different printing devices may use different state definitions and multiple sleep/hibernate states may be configured.

Before entering a hibernate state, the printing device may log a start time and/or start a timer. Logging the wake time from the hibernate state and/or stopping the timer may be used to track the amount of time spent in the hibernate state, and/or the device may wake on a regular interval to report that it is remaining in the hibernate state.

Method 200 may then advance to stage 220 where device 110 may provide a power consumption report for the plurality of printers. The power consumption report may, for example, be based on an amount of power consumed by each of the plurality of printers in each of a plurality of operating states. In some implementations, the power consumption report may further comprise a projected power consumption based on the calculated aggregate power consumption for the plurality of printers. Calculating the aggregate power consumption may comprise evaluating the time spent in each of the plurality of power states according to a configurable power usage figure for each of the plurality of power states.

For example, provide report instructions 130 may comprise instructions to provide a report of historic power consumption. For example, power used by the printer 116 may be reported for a configurable time period, such as an hour, day, week, month, quarter, year, etc. A specific time range may also be specified and the power consumed during that time range calculated based on the received usage report(s).

Provide report instructions 130 may further comprise instructions to provide the report of historic power consumption for the plurality of printers. For example, power consumption may be reported independently and/or in the aggregate for each of a set of printers. The set of printers may comprise all printers for which usage reports have been received and/or a selected subset of the printers.

Provide report instructions 130 may further comprise instructions to provide a report of projected power consumption based on the calculated power consumption for the printer. For example, printer 116 may have consumed an average of 0.15 kWh per day for the last 7 days. A projected power consumption report may simply extrapolate that average for the next 7 days and/or may perform additional calculations such as taking into account year over year changes. The projected power consumption may also use longer term averages and/or standard deviations to provide projections for future power consumption.

Method 200 may then end at stage 250.

Figure 3:
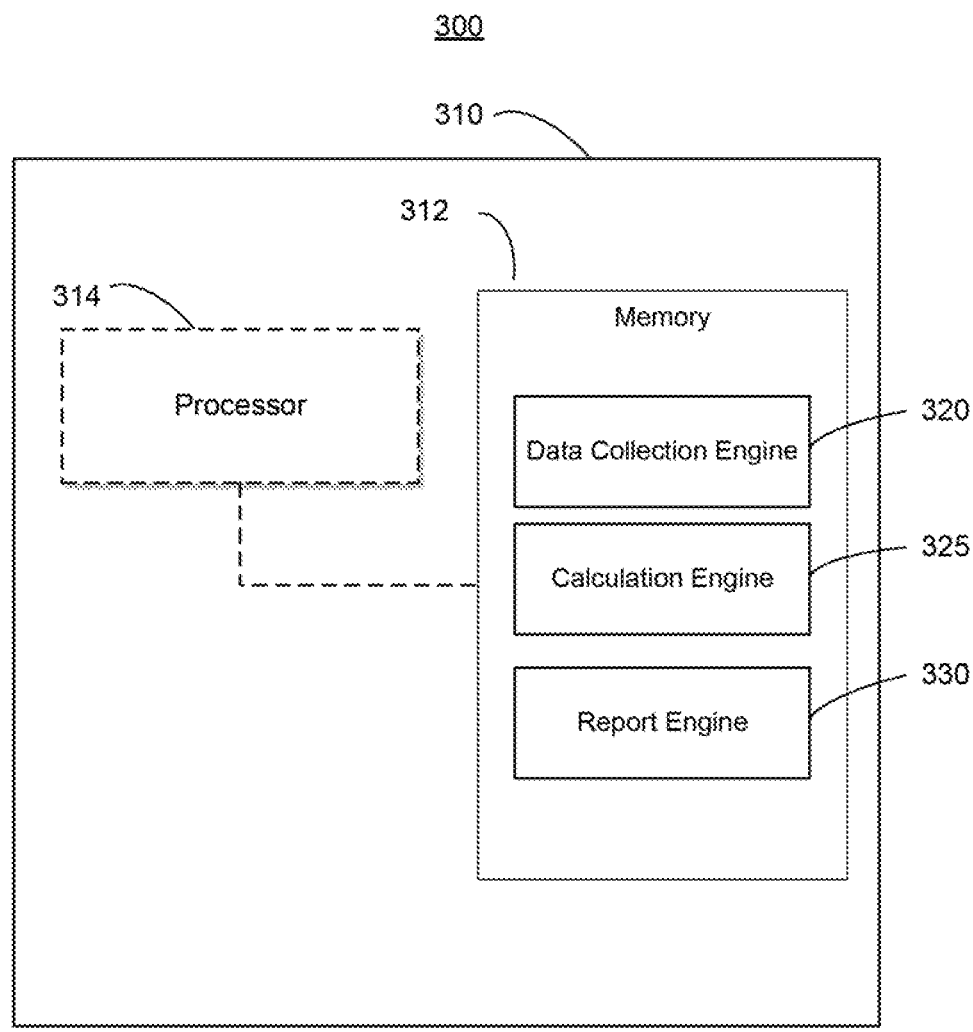
FIG. 3 is an example system for providing a power consumption usage report.

FIG. 3 is a block diagram of an example system 300 for providing a power consumption usage report. System 300 may comprise a computing device 310 comprising a memory 312 and a processor 314. Computing device 310 may comprise, for example, a general and/or special purpose computer, server, mainframe, desktop, laptop, tablet, smart phone, game console, printer and/or any other system capable of providing computing capability consistent with providing the implementations described herein. Computing device 310 may store, in memory 312, a data collection engine 320, a calculation engine 325, and a report engine 330.

Each of engines 320, 325, 330 of system 300 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325, 330. In such examples, apparatus 200 may comprise the machine-readable storage medium storing the instructions and the processing resource to execute the instructions, or the machine-readable storage medium may be separate but accessible to system 300 and the processing resource.

Data collection engine 320 may receive, from each of a plurality of printers, a usage report comprising a count of pages printed, a time spent in each of a plurality of power states, and a runtime for at least one printer component. For example, receive usage report instructions 120 may comprise instructions to receive a usage report from a printer 116. The usage report may comprise a count of pages printed and a time spent in a first power state. In some implementations, the accumulated energy value may be updated after each print job and/or at a configurable interval in each power state. In a hibernate state, the usage report may be provided by printer 116 to device 110 upon transition to a different state rather than at a specific time interval. In some implementations, instructions 120 to receive the usage report from the printer 116 may comprise instructions to receive and aggregate energy usage reports from a plurality of printers.

Calculation engine 325 may calculate a power consumption based on the usage report from each of the plurality of printers, wherein the power consumption is based on a power state power usage figure for each of the plurality of power states, a per-page power usage figure, and a component power usage figure for the at least one printer component. For example, calculate power consumption instructions 125 may calculate a power consumption for the printer according to the usage report(s). For example, an accumulated energy consumption for printer 116 may be calculated as such: Energy (in Watt hours)=(Average Per Page Watt Hours*number of pages printed)+State 1 Enabled [(State 1 Power*Time spent in State 1)]+State 2 Enabled*[(State 2 Power*Time in State 2)] . . . +State N Enabled*[(State N Power*Time in State N)]. In some implementations, the energy used per page may comprise different average per page Watt hours for different types of pages (e.g., mono or color, single sided or duplex, finishing options, etc.). The calculations for each page type may thus be summed in the overall calculation. Power for each state (e.g., State 1 Power) may be based on the wattage drawn by the printer 116 while in that state, and may be measured by the manufacturer. The power for each state may, for example, be defined on a model basis and/or on an individual device basis. In various implementations, the State Power for each state and the average per page Watt hours for each page type may be stored on printer 116 and/or device 110 and may be updated if new data becomes available.

For example, State 1 may comprise a Ready state, State 2 may comprise a Sleep state, and State N may comprise a Hibernate state. Other states (e.g., Standby) may also use the same formula wherein if the state is enabled, then energy used is equal to power drawn in that state*the amount of time spent in that state. Each state may be defined by the components of printer 116 active in each state and thus affecting the power drawn in that state. For example, a Sleep state may have Sleep 1 and Sleep 2 sub-states where the only different component is a fan running in Sleep 1 and stopped in Sleep 2 within printer 116. This may change the power drawn and so the time in each of Sleep 1 and Sleep 2 states may be tracked independently.

Pre-measured power consumption data may be stored for each printing device. The data may be applicable to a plurality of devices, such as each device of a specific model, and/or for specific devices to account for different component configurations. The data may be stored independently on each device (e.g., in firmware memory) and/or stored at a central data collection device. Such data may be updated from time to time as measurements are conducted on relevant devices.

Various pieces of information may be used to create an accurate estimate of energy use at different power states for a printer and/or other device. Such information may comprise, for example, which use states are enabled (e.g., ready, standby, active, sleep, hibernate), time delay before a standby, sleep, and/or hibernate state is entered, print history, power drawn in each state in Watts, average power drawn per page based on page type (e.g., mono or color) in Watt-hours per page, and time spent in each state. The different device states may comprise a ready state where the device is ready to receive and print data, a standby state wherein the device is performing diagnostics, calibration, power-on steps, configuration changes, etc., an active state wherein the device is outputting printed pages, a sleep state wherein printing components are powered off but other components (e.g., network hardware, processor, storage devices) may remain active, and a hibernate state where at least some non-printing components are also powered off. Different printing devices may use different state definitions and multiple sleep/hibernate states may be configured.

Before entering a hibernate state, the printing device may log a start time and/or start a timer. Logging the wake time from the hibernate state and/or stopping the timer may be used to track the amount of time spent in the hibernate state, and/or the device may wake on a regular interval to report that it is remaining in the hibernate state.

Report engine 330 may provide a power consumption report for each of the plurality of printers, wherein the power consumption report comprises a historic power consumption and a projected power consumption. For example, provide report instructions 130 may comprise instructions to provide a report of historic power consumption. For example, power used by the printer 116 may be reported for a configurable time period, such as an hour, day, week, month, quarter, year, etc. A specific time range may also be specified and the power consumed during that time range calculated based on the received usage report(s).

Provide report Instructions 130 may further comprise instructions to provide the report of historic power consumption for the plurality of printers. For example, power consumption may be reported independently and/or in the aggregate for each of a set of printers. The set of printers may comprise all printers for which usage reports have been received and/or a selected subset of the printers.

Provide report instructions 130 may further comprise instructions to provide a report of projected power consumption based on the calculated power consumption for the printer. For example, printer 116 may have consumed an average of 0.15 kWh per day for the last 7 days. A projected power consumption report may simply extrapolate that average for the next 7 days and/or may perform additional calculations such as taking into account year over year changes. The projected power consumption may also use longer term averages and/or standard deviations to provide projections for future power consumption.

Although one computing device 310 is depicted in FIG. 3, certain implementations of system 300 may comprise more than one computing device 310. At least one of the computing devices may be employed and arranged, for example, in at least one server bank, computer bank, data center, and/or other arrangements. For example, the computing devices together may include a cloud computing resource, a grid computing resource, and/or any other distributed computing arrangement. Such computing devices may be located in a single installation and/or may be distributed among many different geographical locations.

The disclosed examples may include systems, devices, computer-readable storage media, and methods for document element re-positioning. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

What is claimed is:

1. A non-transitory machine readable medium storing instructions executable by a processor to:
   receive a usage report from a printer, wherein the usage report comprises a count of pages printed, a time spent in each of a plurality of power states, and a runtime for a printer component of the printer;
   calculate a power consumption for the printer based on the count of pages printed, the time spent in each of the plurality of power states included in the usage report, and the runtime for the printer component; and
   provide a report of historic power consumption.

2. The non-transitory machine readable medium of claim 1, wherein the instructions to calculate the power consumption for the printer comprise instructions to multiply the count of pages printed by a watt-hours per page measurement.

3. The non-transitory machine readable medium of claim 1, wherein the instructions to calculate the power consumption for the printer comprise instructions to calculate power consumed in at least one of the power states by multiplying a wattage drawn in the at least one power state by the time spent in the at least one power state.

4. The non-transitory machine readable medium of claim 3, wherein the wattage drawn in the at least one power state is configurable based on a model of the printer.

5. The non-transitory machine readable medium of claim 1, wherein the plurality of power states comprises: a ready state and a sleep state.

6. The non-transitory machine readable medium of claim 5, wherein a printer component is active in a first power state and inactive in a second power state.

7. The apparatus of claim 1, wherein the instructions to receive the usage report from the printer further comprise instructions to receive the usage report from a plurality of printers.

8. The apparatus of claim 7, wherein the instructions to provide the report of historic power consumption further comprise instructions to provide the report of historic power consumption for the plurality of printers.

9. The apparatus of claim 1, wherein the instructions to provide the report of historic power consumption further comprise instructions to provide a report of projected power consumption based on the calculated power consumption for the printer.

10. A method comprising:
    receiving a usage report including usage data from each of a plurality of printers, wherein the usage data comprises a count of pages printed, a time spent in each of a plurality of power states, and a runtime for a printer component of the printer;
    calculating an aggregate power consumption for the plurality of printers based on the count of pages printed, the time spent in each of the plurality of power states included in the usage data, and the runtime for the printer component; and
    providing a power consumption report for the plurality of printers.

11. The method of claim 10, wherein the power consumption report is based on an amount of power consumed by each of the plurality of printers in each of a plurality of operating states.

12. The method of claim 10, wherein the power consumption report further comprises a projected power consumption based on the calculated aggregate power consumption for the plurality of printers.

13. The method of claim 10, wherein calculating the aggregate power consumption comprises evaluating the time spent in each of the plurality of power states according to a configurable power usage figure for each of the plurality of power states.

14. A system, comprising:
    a data collection engine to:
        receive, from each of a plurality of printers, a usage report comprising a count of pages printed, a time spent in each of a plurality of power states, and a runtime for a printer component of the printer;
    a calculation engine to:
        calculate a power consumption based on the count of pages printed, the time spent in each of a plurality of power states, and the runtime for the printer component included in the usage report from each of the plurality of printers, wherein the power consumption is based on a power state power usage figure for each of the plurality of power states, a per-page power usage figure, and a component power usage figure for the printer component; and
    a report engine to:
        provide a power consumption report for each of the plurality of printers, wherein the power consumption report comprises a historic power consumption and a projected future power consumption.

\* \* \* \* \*